(12) United States Patent
Delinselle et al.

(10) Patent No.: US 10,623,509 B2
(45) Date of Patent: Apr. 14, 2020

(54) INTELLIGENT MAINTENANCE AND REPAIR OF USER PROPERTIES

(71) Applicant: Accenture Global Solutions Limited, Dublin (IE)

(72) Inventors: Jean-Baptiste Delinselle, Alpes-Maritimes (FR); Pierre Duffaut, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 199 days.

(21) Appl. No.: 15/222,317

(22) Filed: Jul. 28, 2016

(65) Prior Publication Data

US 2018/0034926 A1   Feb. 1, 2018

(51) Int. Cl.
| H04L 29/08 | (2006.01) |
| H04L 12/26 | (2006.01) |
| H04L 12/24 | (2006.01) |
| H04L 12/28 | (2006.01) |
| H04W 4/70 | (2018.01) |

(52) U.S. Cl.
CPC .......... *H04L 67/22* (2013.01); *H04L 12/2823* (2013.01); *H04L 41/0677* (2013.01); *H04L 41/0853* (2013.01); *H04L 43/0817* (2013.01); *H04L 43/16* (2013.01); *H04L 67/10* (2013.01); *H04L 67/303* (2013.01); *H04L 41/08* (2013.01); *H04W 4/70* (2018.02)

(58) Field of Classification Search
CPC ........ H04L 67/22; H04L 67/10; H04L 67/303
USPC ....................................................... 709/224
See application file for complete search history.

(56) References Cited

U.S. PATENT DOCUMENTS

| 7,253,741 | B2 | 8/2007 | Fiorletta et al. |
| 8,600,104 | B2 | 12/2013 | Brown |
| 8,650,048 | B1 | 2/2014 | Hopkins, III et al. |
| 8,731,724 | B2 | 5/2014 | Drees et al. |
| 9,110,848 | B1* | 8/2015 | Kim ..................... G06F 11/0709 |
| 9,251,472 | B1 | 2/2016 | Linowes et al. |
| 9,528,861 | B1* | 12/2016 | Haupt ..................... G01D 7/00 |
| 2002/0095269 | A1* | 7/2002 | Natalini .............. H04L 12/2803 702/188 |
| 2002/0107716 | A1* | 8/2002 | Callahan .......... G06Q 10/06311 705/7.21 |
| 2002/0128728 | A1* | 9/2002 | Murakami ......... G05B 23/0245 700/10 |
| 2005/0043924 | A1* | 2/2005 | Ito .......................... F24F 11/30 702/184 |

(Continued)

FOREIGN PATENT DOCUMENTS

| EP | 2393054 | 12/2011 |
| WO | WO2011/139230 | 11/2011 |

OTHER PUBLICATIONS

Reifel et al., "The Internet of Things: Opportunity for Insurers," A.T. Kearney analysis, Auto Insurance Report, National Conference 2014, 10 pages.

(Continued)

*Primary Examiner* — Nicholas R Taylor
*Assistant Examiner* — Chong G Kim
(74) *Attorney, Agent, or Firm* — Fish & Richardson P.C.

(57) ABSTRACT

Methods, systems, and apparatuses, including computer programs encoded on a computer storage medium, for monitoring a condition of an appliance.

29 Claims, 6 Drawing Sheets

(56) References Cited

U.S. PATENT DOCUMENTS

| | | | |
|---|---|---|---|
| 2005/0162273 A1* | 7/2005 | Yoon | G05B 19/0421 340/539.14 |
| 2008/0105134 A1* | 5/2008 | Elston, III | D06F 39/005 99/325 |
| 2008/0108388 A1* | 5/2008 | Ebrom | D06F 39/005 455/557 |
| 2008/0313007 A1* | 12/2008 | Callahan | G06Q 10/06311 705/7.13 |
| 2009/0109021 A1* | 4/2009 | Paoletti | G01R 31/343 340/540 |
| 2010/0033318 A1* | 2/2010 | Tampke | H04M 11/002 340/531 |
| 2010/0259404 A1* | 10/2010 | Cho | H04L 12/2825 340/679 |
| 2011/0022358 A1* | 1/2011 | Han | G05B 19/0428 702/183 |
| 2011/0196547 A1* | 8/2011 | Park | G06Q 50/06 700/296 |
| 2011/0218957 A1* | 9/2011 | Coon | G06Q 30/0601 706/54 |
| 2012/0019378 A1* | 1/2012 | Watson | H04L 12/2825 340/539.1 |
| 2012/0066168 A1 | 3/2012 | Fadell et al. | |
| 2012/0271576 A1 | 10/2012 | Kamel et al. | |
| 2012/0316984 A1* | 12/2012 | Glassman | G06Q 10/06 705/26.7 |
| 2013/0060359 A1* | 3/2013 | Kim | H04L 43/50 700/90 |
| 2013/0066593 A1* | 3/2013 | Kim | H04L 12/2836 702/185 |
| 2013/0185079 A1* | 7/2013 | Park | D06F 33/02 704/275 |
| 2013/0188046 A1* | 7/2013 | Kong | G08B 21/18 348/143 |
| 2013/0245849 A1* | 9/2013 | Paul | H02J 3/14 700/295 |
| 2013/0261821 A1* | 10/2013 | Lu | H04L 12/2807 700/289 |
| 2013/0262197 A1* | 10/2013 | Kaulgud | G05B 13/02 705/14.1 |
| 2013/0311610 A1* | 11/2013 | Kim | H04L 12/2818 709/217 |
| 2014/0009306 A1* | 1/2014 | Haupt | G01W 1/00 340/870.09 |
| 2014/0067094 A1* | 3/2014 | Park | G05B 15/02 700/90 |
| 2014/0100889 A1 | 4/2014 | Tofte | |
| 2014/0136242 A1 | 5/2014 | Weekes et al. | |
| 2014/0244836 A1 | 8/2014 | Goel et al. | |
| 2014/0266755 A1* | 9/2014 | Arensmeier | F24F 11/0086 340/679 |
| 2014/0333322 A1* | 11/2014 | Kabler | G01R 31/2836 324/511 |
| 2014/0342709 A1* | 11/2014 | Stepanian | G06F 1/1698 455/414.1 |
| 2014/0358592 A1 | 12/2014 | Wedig et al. | |
| 2015/0019714 A1 | 1/2015 | Shaashua et al. | |
| 2015/0161738 A1 | 1/2015 | Stempora | |
| 2015/0127172 A1* | 5/2015 | Quam | F24F 11/63 700/276 |
| 2015/0156266 A1 | 6/2015 | Gupta | |
| 2015/0268281 A1 | 9/2015 | Haghighat-Kashani | |
| 2015/0382436 A1* | 12/2015 | Kelly | G08C 17/02 315/131 |
| 2016/0070611 A1* | 3/2016 | Kim | G06F 21/552 714/37 |
| 2016/0072832 A1* | 3/2016 | Kim | G06F 21/552 726/23 |
| 2016/0164748 A1* | 6/2016 | Kim | G06N 5/046 706/47 |
| 2016/0195864 A1* | 7/2016 | Kim | G05B 15/02 709/221 |
| 2016/0217674 A1* | 7/2016 | Stewart | G08B 21/187 |
| 2016/0226732 A1* | 8/2016 | Kim | H04L 12/2807 |
| 2016/0241445 A1* | 8/2016 | Kim | H04L 67/10 |
| 2016/0245538 A1* | 8/2016 | Amer | H04L 12/2818 |
| 2016/0260310 A1* | 9/2016 | Chuang | G08B 21/0446 |
| 2016/0261465 A1* | 9/2016 | Gupta | H04L 12/2816 |
| 2016/0274161 A1* | 9/2016 | Jeon | H04L 12/2825 |
| 2016/0320849 A1* | 11/2016 | Koo | G06F 3/017 |
| 2017/0131174 A1* | 5/2017 | Enev | E03B 7/07 |
| 2017/0195866 A1* | 7/2017 | Kim | H04W 8/005 |
| 2017/0235290 A1* | 8/2017 | Weber | H02J 3/14 700/276 |
| 2017/0289184 A1* | 10/2017 | C | H04L 63/1425 |

OTHER PUBLICATIONS

Extended European Search Report in European Application No. 17182860.1, dated Dec. 12, 2017, 9 pages.

* cited by examiner

| Fault Detection Dataset | | | | | | |
|---|---|---|---|---|---|---|
| Device Type | Current Draw (Failure) | Operating Temperature | Efficency Rating | Flow Rate | Rate of Temperature C | Power Cycles/Per hr |
| GF Electric Range Model H | 14 amps | 215 | 60% | N/A | | N/A |
| GF Electric Range Model C | 20 amps | 210 | 61% | N/A | | 2 |
| H2O Sensor Model X | 2 mili amps | N/A | N/A | 10 gal/min | | 6 |
| Welkin Smart Plug Z | 19 amps | 120 | 50% | N/A | | 7 |
| Jest Smart Thermostat J | N/A | N/A | N/A | N/A | 10 (+) degrees/hour | 5 |
| Jest Smart Thermostat XF | N/A | N/A | N/A | N/A | 10 (-) degrees/hour | 1 |

FIG. 6

INTELLIGENT MAINTENANCE AND REPAIR OF USER PROPERTIES

TECHNICAL FIELD

The present application is related to connected devices and, in some implementations, to systems, methods, devices, and other techniques for monitoring connected devices.

BACKGROUND

The proliferation of connected devices (e.g. devices connected to a network such as the internet, i.e. smart devices or internet of thing (IOT) devices) is expanding at a rapid pace. Connected devices can typically be communicably coupled to a network such as the internet. A number of preventable accidents occur through prolonged use of systems or devices that are operating uncharacteristically. Sometime a user simply ignores the risks associated with a device. Sometimes a user is simply unaware of the risk. For example, a user may be unware that an appliance is drawing more current than it does under normal operation or that an appliance is resetting itself during operation. A user may also not be aware that an appliance or device is consuming additional water, operating at a higher temperature, etc. Other accidents occur from neglect, misuse, or inattentive operation.

SUMMARY

This specification generally discloses systems, methods, and apparatus for monitoring operating parameters of connected device and identifying operating parameters that indicate increased operating risks based on historical operating data. In some implementations, these techniques can provide pre-emptive alert generation and quicker failure response.

Certain implementations provide a computing system for monitoring a condition of an appliance. The system includes a communication module, including one or more processors, configured to cause a communication device to initiate a wireless communication protocol with a sensor module connected to a monitored appliance. The system includes an appliance identification module, including one or more processors, configured to identify, in response to receiving a communication from the monitored appliance through the wireless communication protocol, a type of the monitored appliance. The system includes a fault detection module, including one or more processors. The fault detection module is configured to access data that identifies, for each of a plurality of appliance types, a respective failure point for an operating parameter of the particular appliance type. The fault detection module is configured to identify a measured value of the operating parameter of the monitored appliance based on a signal from the sensor module connected to the monitored appliance. The fault detection module is configured to compare the measured value of the operating parameter of the monitored appliance to the respective failure point of the operating parameter of the appliance type that corresponds to the type of the monitored appliance. The fault detection module is configured to generate an alert signal in response to identifying that the measured value of the operating parameter of the monitored appliance meets a pre-specified threshold of the respective failure point of the operating parameter of the appliance type that corresponds to the type of the monitored appliance.

In some implementations, the operating parameter comprises an appliance temperature characteristic.

In some implementations, the operating parameter comprises an appliance efficiency rating.

In some implementations, the operating parameter comprises an appliance electric current draw.

In some implementations, the at least one operating parameter comprises a ratio of an electric current draw to a power setting.

In some implementations, the type includes a model number.

In some implementations, the at least one operating parameter comprises a ratio of a change in power draw to a time duration.

In some implementations, the failure point is determined based on a record of a previous failure for an appliance of the same appliance type as the monitored appliance.

In some implementations, the failure point is determined based on an insurance claim report.

In some implementations, the pre-specified threshold indicates an acceptable operating range.

Certain implementations provide a computer-implemented method executed by one or more processors of an electronic computing device. The method includes accessing a database including data that identifies respective failure points for an operating parameter of a plurality of appliances having a plurality of appliance types. The method includes polling a sensor module coupled to a monitored appliance to identify a value of the operating parameter of the appliance at a particular time. The method includes selecting, from the plurality of appliances having the plurality of appliance types, at least one appliance that corresponds to the monitored appliance. The method includes comparing the identified value of the operating parameter of the monitored appliance to the respective failure points for the operating parameter of the at least one faulty appliance selected. The method includes generating an alert communication in response to identifying that the operating parameter of the monitored appliance meets a pre-specified threshold of the respective failure points for the operating parameter of the at least one faulty appliance selected.

In some implementations, the method includes transmitting the alert communication from a first computing device to a second computing device.

In some implementations, the transmission is wireless.

In some implementations, the method includes providing offer an incentive to a user to repair or replace the monitored appliance.

In some implementations, the method includes polling a mobile electronic device for an occupancy detection and varying the alert communication in response to an occupancy detection.

In some implementations, the method includes varying the alert in response to the parameter type.

In some implementations, the method includes polling a mobile electronic device for to detect an activity of a user and varying the alert in response to a detection of an activity of a user.

In some implementations, the method includes accessing the database remotely from a computing device.

Various implementations provide a computing system for monitoring a condition of an appliance. The system includes a communication module configured to generate a bi-directional wireless communication gateway with a monitored appliance. The communication module is configured to detect a type of the monitored appliance in response to receipt a communication from the monitored appliance. The system includes a sensor module configured to sense an operating parameter of the monitored appliance via communication with the monitored appliance over the bi-directional wireless communication gateway. The system includes a storage device including a database containing data that identifies, for each of a plurality of appliance types, a respective failure point for an operating parameter of the particular appliance type. The system includes a computing device communicably coupled to the storage device and the sensor module. The computing device is configured to identify a measured value of the operating parameter of the monitored appliance based on a signal from the sensor module connected to the monitored appliance. The computing device is configured to compare the measured value of the operating parameter of the monitored appliance to the respective failure point of the operating parameter of the appliance type that corresponds to the type of the monitored appliance. The computing device is configured to generate an alert signal in response to identifying that the measured value of the operating parameter of the monitored appliance meets a pre-specified threshold of the respective failure point of the operating parameter of the appliance type that corresponds to the type of the monitored appliance.

In some implementations, the system includes a communication gateway communicably coupled to the monitored appliance.

In some implementations, the communication module is configured to communicate with an electrical outlet electrically coupled to the monitored appliance.

In some implementations, the alert is configured for display on a graphical user interface.

In some implementations, the alert includes a short message service communication.

In some implementations, the system includes a performance reduction module configured to transmit a command to cause the monitored appliance to reduce a performance characteristic based on the alert, wherein the reduction decreases the proximity of the operating parameter to the operating parameter failure point.

In some implementations, the system includes a power elimination module configured to open a circuit connected to the monitored appliance to eliminate power to the monitored appliance.

In some implementations, the system includes a communication module including a Bluetooth antennae.

In some implementations, the sensor module includes at least one of a current sensor and a voltage sensor.

In some implementations, the system includes a graphical user interface.

Certain implementations provide a non-transitory computer-readable storage medium coupled to one or more processors and having instructions stored thereon. When the instructions are executed by the one or more processors, the instructions cause the one or more processors to access a database including data that identifies respective failure points for an operating parameter of a plurality of appliances having a plurality of appliance types. When the instructions are executed by the one or more processors, the instructions cause the one or more processors to poll a sensor module coupled to a monitored appliance to identify a value of the operating parameter of the appliance at a particular time. When the instructions are executed by the one or more processors, the instructions cause the one or more processors to select, from the plurality of appliances having the plurality of appliance types, at least one appliance that corresponds to the monitored appliance. When the instructions are executed by the one or more processors, the instructions cause the one or more processors to compare the identified value of the operating parameter of the monitored appliance to the respective failure points for the operating parameter of the at least one faulty appliance selected. When the instructions are executed by the one or more processors, the instructions cause the one or more processors to generate an alert communication in response to identifying that the operating parameter of the monitored appliance meets a pre-specified threshold of the respective failure points for the operating parameter of the at least one faulty appliance selected.

Certain implementations provide a computing system for monitoring a condition of an appliance. The system includes a communication module configured to generate a bi-directional wireless communication gateway with a monitored appliance. The communication module is configured to detect a type of the monitored appliance in response to receipt a communication from the monitored appliance. The sensor module is configured to sense an operating parameter of the monitored appliance via communication with the monitored appliance over the bi-directional wireless communication gateway. The system includes a storage device including a database containing a dataset including data corresponding to at least one operating parameter failure point for a plurality of faulty appliances having a plurality of appliance types and having experienced a plurality of fault conditions. The system includes a computing device communicably coupled to the storage device and the sensor module. The computing device is configured to select from the plurality of faulty appliances having the plurality of appliance types, at least one faulty appliance corresponding to the monitored appliance. The computing device is configured to compare the operating parameter of the monitored appliance to the at least one operating parameter failure point of the at least one faulty appliance selected. The computing device is configured to generate an alert communication in response to the operating parameter of the monitored appliance reaching a pre-specified threshold of the at least one operating parameter failure point.

Implementations disclosed herein can help prevent accidents by readily making consumers aware of heightened risk levels through a combination of information sharing and data analysis that collaboratively facilitate predictive modeling. This predictive modeling provides a heightened ability to determine where failure points for specific appliances and to generate operating profiles for those appliances. As a result, we can more accurately predict impending failures, generate maintenance alerts, etc. Additionally, the use of a central home controller in accordance with particular implementations that talks to individual sensing devices provides a means to convert messages communicated in various formats/protocols to the central device into a standard format for monitoring, thereby enabling coordination and interoperability among various devices. It is appreciated that implementations in accordance with the present disclosure can include any combination of the aspects and features described herein. That is, implementations in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

The drawings primarily are for illustrative purposes and are not intended to limit the scope of the inventive subject matter described herein. The drawings are not necessarily to scale; in some instances, various aspects of the inventive subjection matter disclosed herein may be shown enlarged in the drawings to facilitate an understanding of different features. In the drawings, like reference characters generally refer to like features (e.g. functionally similar and/or structurally similar elements).

FIG. 6 illustrates a dataset accessible by a connected device remote monitoring system.

The features and advantages of implementations of the inventive subject matter disclosed herein will become more apparent from the detailed description set forth below when taken in conjunction with the drawings.

DETAILED DESCRIPTION

Implementations of the present disclosure are generally directed to computing systems and methods for monitoring a condition of an appliance. As described in further detail herein, the systems and methods provide an analytic structure configured to analyze sensors, and/or components of a system and the data produced thereby in order to identify abnormal operational activities or parameters that can indicate a system or device is operating in a manner that can lead to failure or indicates a failure.

Figure 1:
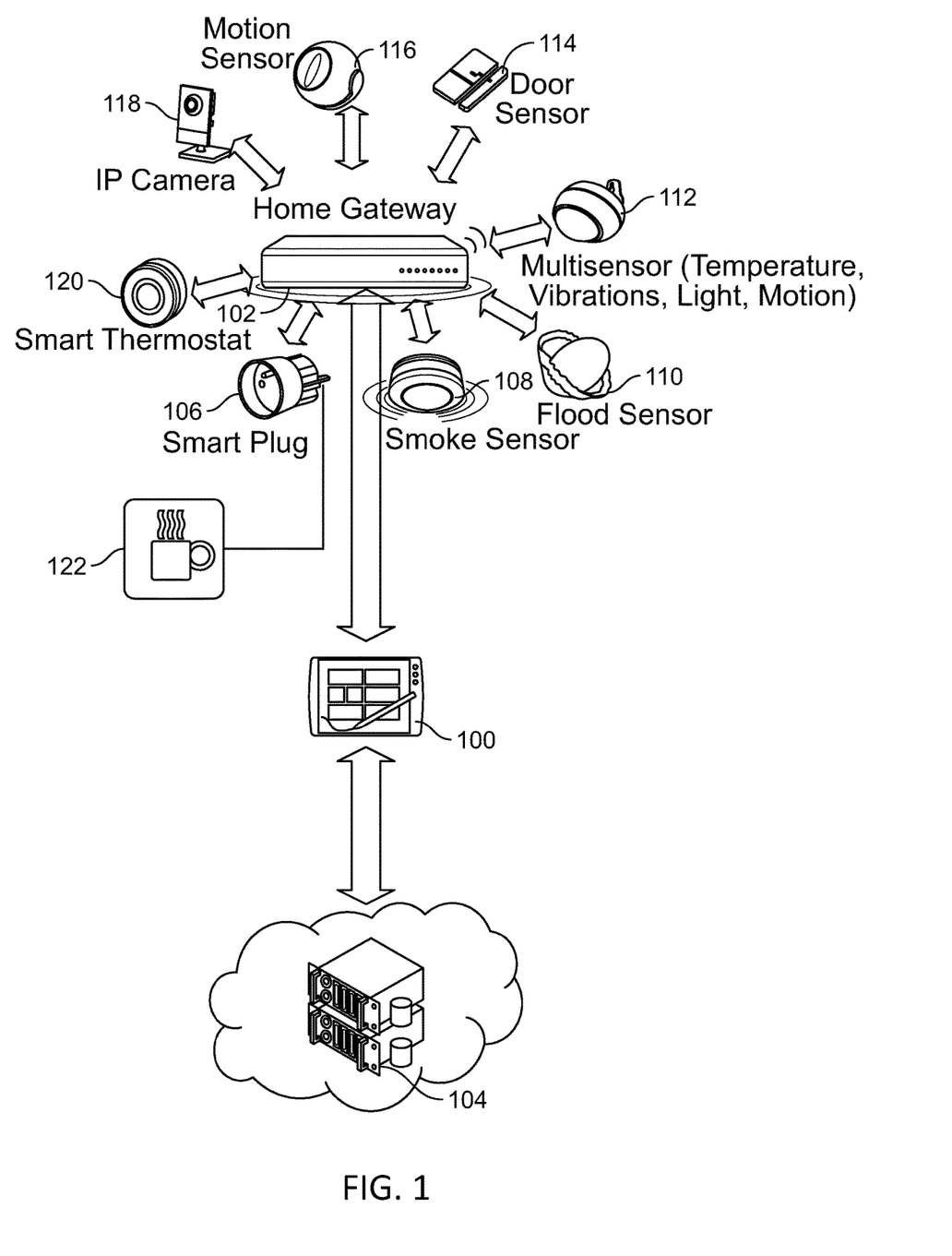
FIG. 1 depicts an electronic device configured to access a remote server communicably coupled to connected devices through a home gateway.

FIG. 1 depicts an electronic device configured to access a remote server communicably coupled to connected devices through a home gateway. An electronic device, such as mobile electronic device 100 is configured to connect to a server system 104 for remotely monitoring one or more connected devices. The mobile electronic device 100 includes an application programming interface configured to operate on the electronic device and configured to generate a user interface on the electronic device for remotely monitoring via a remote connection with the server system 104. The server system 104, or one or more computing devices, communicably coupled to the server system 104, includes a program operating thereon configured to obtain data through a home gateway device 102. The home gateway device 102 obtains data from one or more connected devices 106-122 and sends it to the server system 104 via an internet connection. In some implementations the server system 104 can obtain data directly from the one or more connected devices 106-122.

As demonstrated in FIG. 1, the connected devices can include a range of connected devices, which can include, but is not limited to a smart plug 106, a smoke, heat, and/or carbon dioxide detector 108, a flood sensor 110 (or fluid flow sensor), a multi-sensor 112, a door sensor, 114, a motion sensor 116, a camera 118, and a thermostat 120. A connected device can include a device or appliance such as a coffee maker 122 connected to the smart plug 106. Accordingly, the device itself or a sensor coupled to the device can be configured to measure and transmit one or more operating parameters to the server system 104. In certain implementations, the server system 104 can be configured to poll the connected devices 106-122. In certain implementations, the connected devices 106-122 can be configured to transmit one or more selected parameters automatically at a pre-specified interval. The server system 104 can be configured to store the data obtained for a predetermined time period. The server system 104 can be configured to delete the data after the pre-specified period if the system determines that the monitored parameter has not reached a pre-specified value.

As discussed in further detail herein, the threshold value can be determined based on a failure of one or more devices having a device type corresponding to the monitored device (s). The determination can be obtained from one or more insurance claim reports. For example, one or more insurers can generate incident reports for claims that are made. The reports can indicate the cause of an accident, such as a fire being caused by a coffee pot left on or a pipe bursting. The report can include technical details that are the result of a follow-up investigation after each incident occurs and that includes information about the faulty appliance or a sensor reading from a device that was taken just prior to the event. The information can be obtained from an analysis of the device and or one or more processors or memories in the device if the device results in a failure. The information can be obtained from an analysis of other devices that were operational prior to the incident. Once the incident occurs and the incident report for the claim is generated based on an investigation, the information can be cataloged in a central database by the information obtained and the device that was analyzed. The monitoring device can access the central database during monitoring by associating the identity of any monitored device with any corresponding device that is catalogued in the database and monitor the monitored device for conditions that approach a pre-specified threshold of the values that were entered into the database as a result of the incident report.

The pre-specified threshold can indicate an acceptable operating range. Operating values within the acceptable range can indicate no problem, but operating values outside of the acceptable range (but within the failure points) can indicate an increased risk of failure. In certain implementations, the application running on the server system is configured to categorize the information obtained based on an identification of the connected device and to use that identification to determine, which device data to consider in connection with determining the pre-specified threshold.

Figure 2:
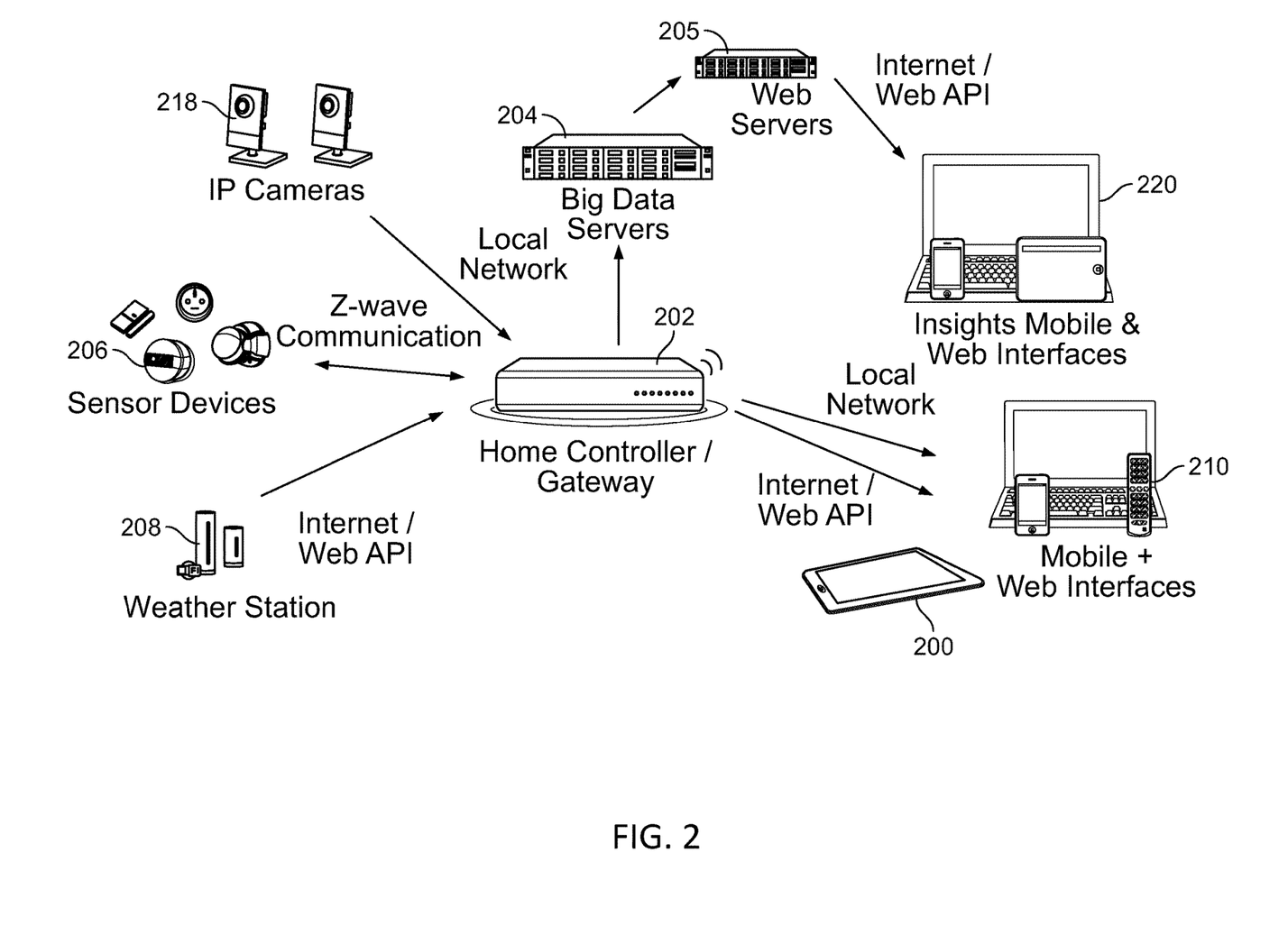
FIG. 2 shows various electronic devices including an interface for monitoring various connected devices.

FIG. 2 shows various electronic devices including an interface for monitoring various connected devices. In some implementations, a computing system for monitoring a condition of an appliance operates via one or more mobile electronic computing devices 200, 210 configured to connect directly to a home controller 202, for example over a local network. The electronic computing devices 200, 210 can include an application operating thereon to control one or more connected devices 206, 208, and 218. As illustrated in FIG. 2, a mobile electronic device 220 can be configured to access a web server 205 communicably coupled to a data server 204. The mobile electronic device 220 can access the web server to obtain status information about the connected devices, 206, 208, and 218 obtained from the data server. As illustrated in FIG. 1, the data server can obtain the information about the connected device via the home controller 202. Once the data is placed on the data server 204, an application running on the web browser can be used to analyze the data.

The mobile electronic device 220 can operate an application that interfaces with the application running on the web server to determine the status of the connected devices 206, 208, and 218. An application that is running on the devices 200 and 210 (which application can be a subset of the application running on the devices 220) can be used to control the connected devices 208, 206, 218, or any other connected device via the home controller 202, for example to reduce and disconnect power or operation of the connected device in response to the monitoring operations. For example, if the monitoring system indicates a particular connected device is operating at unsafe temperature, is drawing too much power, is power cycling erratically, etc., the system can initiate one or more response actions to control the operation of the connected device, in accordance with particular implementations.

Figure 3:
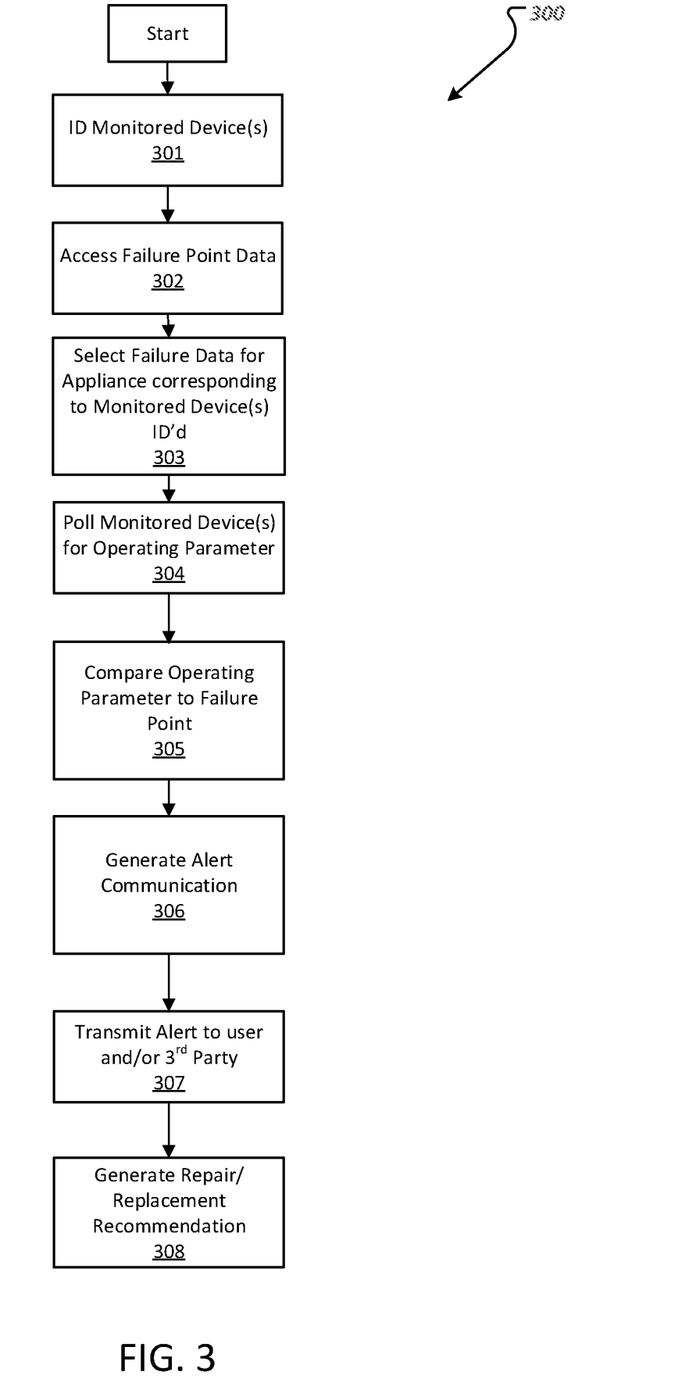
FIG. 3 is a flow diagram of operations of a system for remotely monitoring various connected devices.

FIG. 3 is a flow diagram of operations of a system for remotely monitoring various connected devices. A monitoring system 300 is configured to operate on a computing device. Once the system 300 is initiated by opening an application operating on the computing device, the system 300 initiates device monitoring by identifying a monitored device at 301. This identification can be completed by direct or indirect communication with the connected device. For example, in some implementation this information may be obtained from a home controller communicably coupled to the monitored device.

At 302, the system 300 accesses a database including data that identifies respective failure points for a plurality of appliance types. This database can be a compilation of data from prior insurance reports or claims. The failure points identify at least one parameter for each particular appliance. The operating parameter can include various operating parameters, which can include, but is not limited to, a voltage measurement, a current measurement, an operating temperature, power cycling, resets, fluid flow volumes, etc.

At 303, the system 300 selects the data needed from the database based on the monitored device identified at 301.

At 304, the system 300 polls the monitored device(s), for example via a home controller, for an operating parameter. In some implementations, the polling can include accessing the data obtained by the home controller and transmitted to the server.

At 305, the system 300 compares the polled operating parameter of the monitored device to the failure point obtained from the dataset. In response to the operating parameter reaching a pre-specified threshold of the failure point, the system generates an alert communication at 306. For example, the system 300 may identify that the maximum electrical current that can safely be drawn by a particular appliance or particular appliance type is 3 Amperes. If a monitored appliance draws 80-percent of this maximum (e.g., 2.4 Amperes), the system 300 may generate an alert to warn that the appliance is operating out of normal abounds and is approaching the maximum current limit.

At 307, the alert is transmitted to another computing device or to a 3$^{rd}$ party, such as an emergency service, a repair services, a device manufacturer, retailer, and/or insurance carrier.

At 308 a recommendation is provided either directly to a user device or to the 3$^{rd}$ party for transmission to the user. In implementations where the 3$^{rd}$ party includes an insurer, the insurer can provide a user with an incentive in response to repairing or replacing the appliance based on the recommendation. For example, in response to an alert of a heightened risk being transmitted to a computing system of the insurer in connection with an appliance operating with abnormal operating parameters, the computing system can generate a communication to the insured requesting that an appliance be repaired. The insured may then be able to access his or her profile in the computing system and provide proof of repair or replacement (e.g. proof of payment). In response to providing this information, the computing system can calculate the reduction in risk and discount the policy of the insured accordingly. Alternatively, the computing system can also send a message to dispatch a repairman to the customer's property. The repairman can then logon to the system and provide details of any repairs, which can also prompt the computing system to calculate a risk reduction and reward the insured accordingly.

Figure 4:
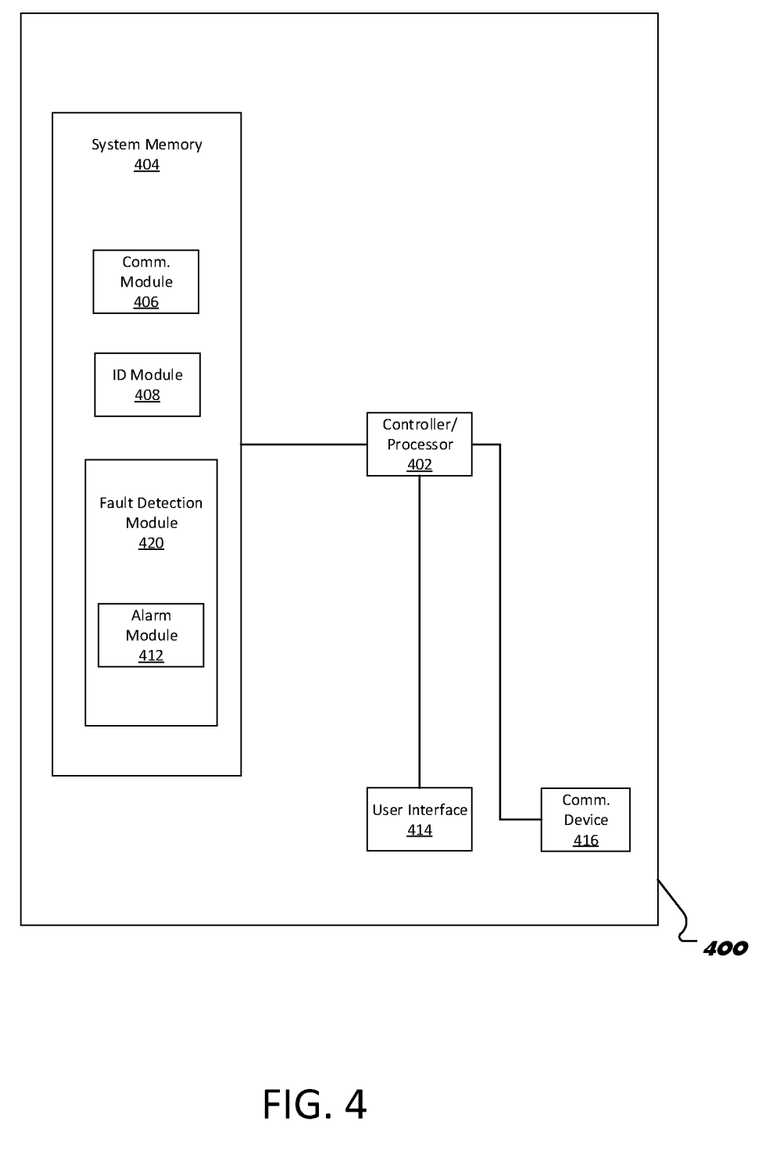
FIG. 4 shows a system for remotely monitoring connected devices.

FIG. 4 shows a system for remotely monitoring connected devices. A system 400 can include a computing device specially programmed with an operating system. The system 400 includes a computing device including a device having a controller component 402 communicably coupled to a user interface 414 such as graphical user interface for displaying information and a communication device 416 such as a wireless communication module. The controller 402 is coupled to a system memory 404 including a communication module 406, an identification module 408, a fault detection module 420, and an alert module 412. The communication module 406 is configured to cause the communication device 416 to transmit and receive data from the computing device 400 to a home controller, connected device, or server system.

The ID module 408 is configured to initiate a protocol for identifying a device being monitored via the controller 402 and the communication device 416 of the computing device.

The fault detection module 420 is configured to initiate the analysis of the operating parameters, the determination of the threshold value, the comparison of the operating parameters polled to the threshold values, and generation of the alert communication or alert signal based on the comparison. The fault detection module 420, can generate alert communication in the user interface 414 of the computing device 400 via the controller 402. Similarly, the ID module 408 and the communication module 406 can cause particular information to be displayed in the user interface 414 via the controller 402.

Figure 5:
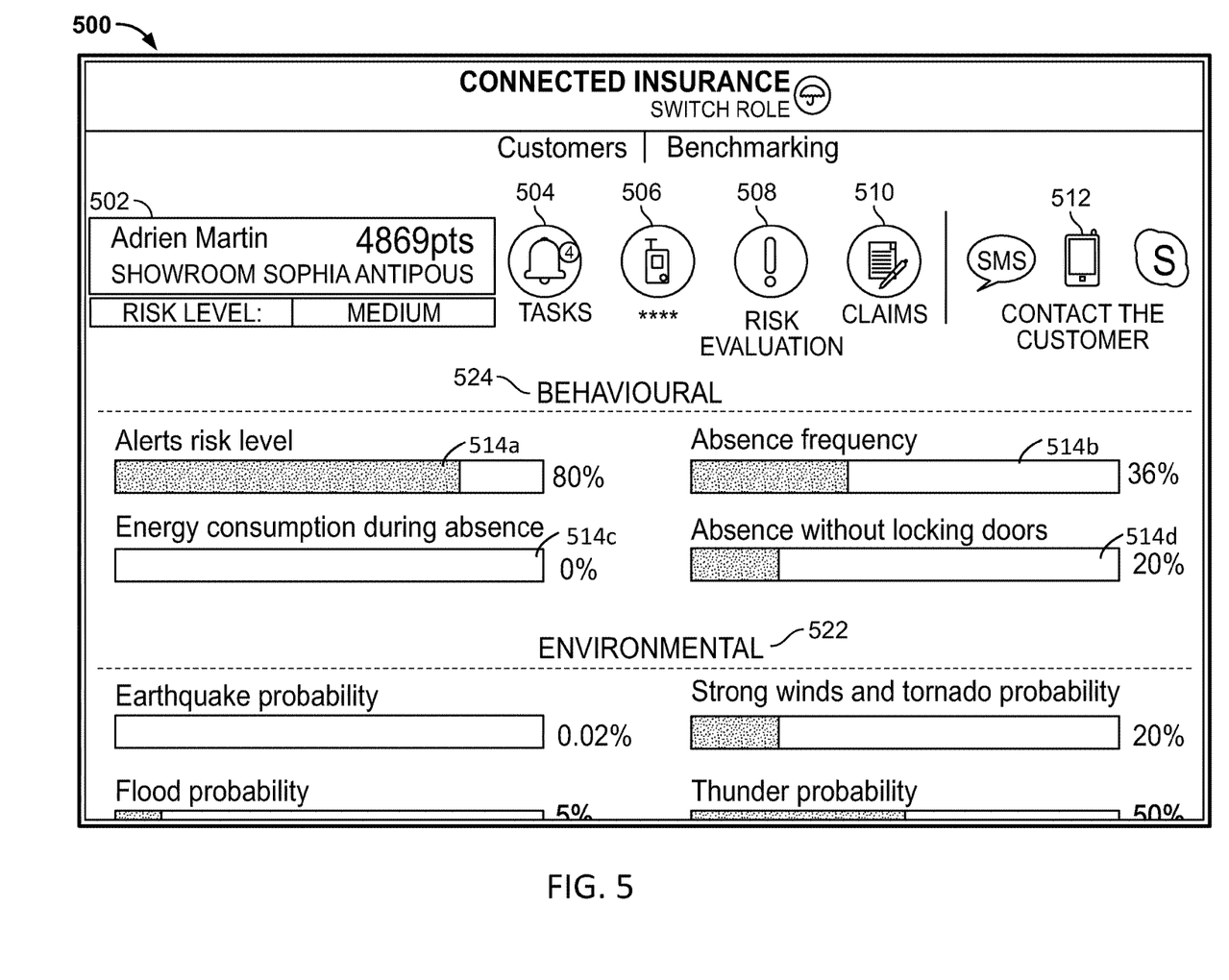
FIG. 5 illustrates user interface of a system for remotely monitoring connected devices.

FIG. 5 illustrates user interface of a system for remotely monitoring connected devices. A dashboard display 500 can be presented in the user interface of a computing device, such as computing device 400 of FIG. 4, on a device such as devices 200, 210, 220, of FIG. 2, or on a device such as device 100. The dashboard display shows information such as a user identification 502. The user identification can be determined based on the user logging into the monitoring system.

The dashboard can identify tasks 504 providing action items for a user, such as repair requests, maintenance requests, or replacement requests. An overview icon 506 generates the current display of the dashboard provide shown in FIG. 5. A risk evaluation icon 508 can provide additional details about what connected devices are at risk and what the level of the risk has been determined to be. A claims icon 510 identifies any claims that the user has made, for example that are in progress or that have historically been processed. A contact icon 512 can identify the modes of contact for sending any alert communication generation and can provide options to reconfigure the alert communication. For example, the user may be able to use this interface to select alerts for certain appliances as text messages while indicating an e-mail should be sent for other alerts. The overview icon provides graphical presentations of various aspects of the user's monitored behavior in a behavioral pane 524. Status bars 514a-514d provide graphical presentations of things such as the alert risk level, and occupancy information regarding occupancy, which can be based information from a plurality of sensors, such as infrared sensors, motion detections, BLUETOOTH detections, polling of a burglary alarm, etc. The occupancy information can provide details about energy consumption or door lock state detection. An environmental pane 522 can include information regarding any relevant environmental, which can be obtained from $3^{rd}$ party sources, for example via the internet based on the location of the connected devices.

FIG. 6 illustrates a dataset accessible by a connected device remote monitoring system. The dataset 600 includes data that provides various operating parameters 604a-604f. The operating parameters can include operating parameters such as an electrical current draw 604a, an operating temperature 604b, an efficiency rating 604c, a fluid flow rate 604d, a rate of temperature change 604e, a power cycling rate 604f. Some of the operating parameters may be inapplicable to certain devices. The device types are illustrated in a device type category 602. A device entry 606 can indicate a model of the device type so that a specific device for a precise comparison can be selected. A blank or non-applicable entry 608 can be catalogued for any operating parameter that's not applicable to a particular device. The operating parameters can include entries such as rate entries 610.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations and functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable result.

What is claimed is:

1. A first computing system for monitoring a condition of an appliance, the system comprising:
    a communication module, including one or more processors, configured to cause a communication device to wirelessly communicate with a sensor module connected to a monitored appliance;
    an appliance identification module, including one or more processors, configured to identify, based on a communication from the monitored appliance, a type of the monitored appliance; and
    a fault detection module, including one or more processors, configured to:
        (i) access data that identifies, for each of a plurality of appliance types, a respective failure point for an operating parameter of the particular appliance type, wherein the respective failure point defines a cutoff for an acceptable range of values for the operating parameter of the particular appliance type, wherein the respective failure point for the operating parameter of the appliance type that corresponds to the type of the monitored appliance is based on a compilation of data from prior insurance claim reports;
        (ii) identify a measured value of the operating parameter of the monitored appliance based on a signal from the sensor module connected to the monitored appliance,
        (iii) compare the measured value of the operating parameter of the monitored appliance to the respective failure point of the operating parameter of the appliance type that corresponds to the type of the monitored appliance, and
        (iv) generate an alert signal in response to identifying that the measured value of the operating parameter of the monitored appliance meets a pre-specified threshold of the respective failure point of the operating parameter of the appliance type that corresponds to the type of the monitored appliance,
    wherein the first computing system is configured to transmit the alert signal to a second computing system in response to identifying that the measured value of the operating parameter of the monitored appliance meets the pre-specified threshold,
    wherein in response to receiving the alert signal from the first computing system, the second computing system is configured to notify an entity associated with the monitored appliance about a problem with the monitored appliance, including providing an incentive for the entity to repair the monitored appliance, and
    wherein the second computing system is operated independently of the first computing system.

2. The system of claim 1, wherein the operating parameter comprises an appliance temperature characteristic.

3. The system of claim 1, wherein the operating parameter comprises an appliance efficiency rating.

4. The system of claim 1, wherein the operating parameter comprises an appliance electric current draw.

5. The system of claim 1, wherein the at least one operating parameter comprises a ratio of an electric current draw to a power setting.

6. The system of claim 1, wherein the type includes a model number.

7. The system of claim 1, wherein the at least one operating parameter comprises a ratio of a change in power draw to a time duration.

8. The system of claim 1, wherein the respective failure point is determined further based on an insurance claim report.

9. A computer-implemented method executed by one or more processors of an electronic computing device, the method comprising:
    accessing a database including data that identifies respective failure points for an operating parameter of a plurality of appliances having a plurality of appliance types, wherein the respective failure points define a cutoff for an acceptable range of values for the operating parameter for each of the plurality of appliances, wherein the respective failure point for the operating parameter of an appliance type that corresponds to a type of a monitored appliance is based on a compilation of data from prior insurance claim reports;

polling a sensor module coupled to the monitored appliance to identify a value of the operating parameter of the appliance at a particular time;

selecting, from the plurality of appliances having the plurality of appliance types, at least one appliance having an appliance type that corresponds to the type of the monitored appliance;

comparing the identified value of the operating parameter of the monitored appliance to the respective failure point for the operating parameter of the at least one appliance having the appliance type that corresponds to the type of the monitored appliance;

generating an alert communication in response to identifying that the identified value of the operating parameter of the monitored appliance meets a pre-specified threshold of the respective failure point for the operating parameter of the at least one appliance having the appliance type that corresponds to the type of the monitored appliance; and transmitting, from a first computing system, the alert communication to a second computing system in response to identifying that the identified value of the operating parameter of the monitored appliance meets the pre-specified threshold, wherein in response to receiving the alert communication from the first computing system, the second computing system is configured to notify an entity associated with the monitored appliance about a problem with the monitored appliance, including providing an incentive for the entity to repair the monitored appliance, and wherein the second computing system is operated independently of the first computing system.

10. The method of claim 9, wherein the alert communication is transmitted wirelessly from the first computing system to the second computing system.

11. The method of claim 9, further comprising polling a mobile electronic device for an occupancy detection and varying the alert communication in response to the occupancy detection.

12. The method of claim 9, further comprising varying the alert communication.

13. The method of claim 9, further comprising polling a mobile electronic device to detect an activity of a user and varying the alert communication in response to detecting activity of a user.

14. The method of claim 9, further comprising, accessing the database remotely from a computing device.

15. A first computing system for monitoring a condition of an appliance, the system comprising:

a communication module configured to generate a bi-directional wireless communication gateway with a monitored appliance, the communication module configured to detect a type of the monitored appliance in response to receipt of a communication from the monitored appliance;

a sensor module configured to sense an operating parameter of the monitored appliance via communication with the monitored appliance over the bi-directional wireless communication gateway;

a storage device including a database containing data that identifies, for each of a plurality of appliance types, a respective failure point for an operating parameter of the particular appliance type, wherein the respective failure point defines a cutoff for an acceptable range of values for the operating parameter of the particular appliance type, wherein the respective failure point for the operating parameter of the appliance type that corresponds to the type of the monitored appliance is based on a compilation of data from prior insurance claim reports; and a computing device communicably coupled to the storage device and the sensor module, the computing device configured to:

identify a measured value of the operating parameter of the monitored appliance based on a signal from the sensor module connected to the monitored appliance, compare the measured value of the operating parameter of the monitored appliance to the respective failure point of the operating parameter of the appliance type that corresponds to the type of the monitored appliance, generate an alert signal in response to identifying that the measured value of the operating parameter of the monitored appliance meets a pre-specified threshold of the respective failure point of the operating parameter of the appliance type that corresponds to the type of the monitored appliance, and transmit the alert signal to a second computing system in response to identifying that the measured value of the operating parameter of the monitored appliance meets the pre-specified threshold, wherein in response to receiving the alert signal from the first computing system, the second computing system is configured to notify an entity associated with the monitored appliance about a problem with the monitored appliance, including providing an incentive for the entity to repair the monitored appliance, and wherein the second computing system is operated independently of the first computing system.

16. The system of claim 15, further comprising a communication gateway communicably coupled to the monitored appliance.

17. The system of claim 15, wherein the communication module is configured to communicate with an electrical outlet electrically coupled to the monitored appliance.

18. The system of claim 15, wherein the alert signal is formatted for display on a graphical user interface.

19. The system of claim 15, wherein the alert signal includes a short message service communication.

20. The system of claim 15, further comprising a performance reduction module configured to transmit a command to cause the monitored appliance to reduce a performance characteristic based on the alert signal, wherein the reduction decreases a proximity of the operating parameter to the operating parameter failure point.

21. The system of claim 15, further comprising a power elimination module configured to open a circuit connected to the monitored appliance to eliminate power to the monitored appliance.

22. The system of claim 15, wherein the communication module includes a BLUETOOTH antenna.

23. The system of claim 15, wherein the sensor module includes at least one of a current sensor or a voltage sensor.

24. The system of claim 15, wherein the system further comprises a graphical user interface.

25. A non-transitory computer-readable storage medium coupled to one or more processors of a first computer system, the first computer system having instructions stored thereon which, when executed by the one or more processors, cause the one or more processors to:

access a database including data that identifies respective failure points for an operating parameter of a plurality of appliances having a plurality of appliance types, wherein the respective failure points define a cutoff for an acceptable range of values for the operating parameter of the plurality of appliance types, wherein the respective failure point for the operating parameter of an appliance type that corresponds to a type of a monitored appliance is based on a compilation of data from prior insurance claim reports;

poll a sensor module coupled to the monitored appliance to identify a value of the operating parameter of the appliance at a particular time;

select, from the plurality of appliances having the plurality of appliance types, at least one appliance having an appliance type that corresponds to the type of the monitored appliance;

compare the identified value of the operating parameter of the monitored appliance to the respective failure point for the operating parameter of the at least one appliance having the appliance type that corresponds to the type of the monitored appliance;

generate an alert communication in response to identifying that the identified value of the operating parameter of the monitored appliance meets a pre-specified threshold of the respective failure point for the operating parameter of the at least one appliance having the appliance type that corresponds to the type of the monitored appliance; and transmit the alert communication to a second computing system in response to identifying that the identified value of the operating parameter of the monitored appliance meets the pre-specified threshold, wherein in response to receiving the alert communication from the first computing system, the second computing system is configured to notify an entity associated with the monitored appliance about a problem with the monitored appliance, including providing an incentive for the entity to repair the monitored appliance, and wherein the second computing system is operated independently of the first computing system.

26. The system of claim 1, further comprising:
generating a predictive failure point for each appliance in a plurality of appliances using collaborative predictive modeling based on data provided by the sensor module connected to each of the appliances in the plurality of appliances.

27. The system of claim 1, further comprising:
receiving, by the communication module, communications from a plurality of appliances, wherein at least some of the communications are communicated to the communication module according to different wireless communication protocols; and converting, by the communication module, the communications from the plurality of appliances to a common communication protocol.

28. The system of claim 1, wherein the operating parameter of the particular appliance type represents at least one of an electrical condition or a mechanical condition of the monitored appliance.

29. The system of claim 26, wherein the predictive failure point indicates a predicted likelihood of a potential failure point for each of the plurality of appliance types.

* * * * *